United States Patent
Curcio et al.

(10) Patent No.: US 8,161,158 B2
(45) Date of Patent: Apr. 17, 2012

(54) METHOD IN A COMMUNICATION SYSTEM, A COMMUNICATION SYSTEM AND A COMMUNICATION DEVICE

(75) Inventors: Igor D. Curcio, Tampere (FI); Miska Hannuksela, Tampere (FI); Viktor Varsa, Irving, TX (US)

(73) Assignee: Nokia Corporation, Espoo (FI)

( * ) Notice: Subject to any disclaimer, the term of this patent is extended or adjusted under 35 U.S.C. 154(b) by 1811 days.

(21) Appl. No.: 10/255,560

(22) Filed: Sep. 25, 2002

(65) Prior Publication Data

US 2004/0057412 A1   Mar. 25, 2004

(51) Int. Cl.
*G06F 15/16* (2006.01)

(52) U.S. Cl. ........................ 709/226; 709/228

(58) Field of Classification Search .................. 709/226, 709/231, 233, 227, 228, 237
See application file for complete search history.

(56) References Cited

U.S. PATENT DOCUMENTS

| | | | |
|---|---|---|---|
| 6,058,113 A * | 5/2000 | Chang | 370/390 |
| 6,263,371 B1 * | 7/2001 | Geagan et al. | 709/231 |
| 6,553,006 B1 * | 4/2003 | Kalliokulju et al. | 370/310 |
| 6,931,448 B2 * | 8/2005 | Holler et al. | 709/227 |
| 6,940,871 B1 * | 9/2005 | Grossmann | 370/468 |
| 7,068,623 B1 * | 6/2006 | Barany et al. | 370/329 |
| 7,076,552 B2 * | 7/2006 | Mandato | 709/226 |
| 7,089,309 B2 * | 8/2006 | Ramaley et al. | 709/226 |
| 7,106,718 B2 * | 9/2006 | Oyama et al. | 370/340 |
| 7,133,922 B1 * | 11/2006 | She et al. | 709/231 |
| 7,227,865 B2 * | 6/2007 | Shaheen et al. | 370/395.21 |
| 7,394,807 B2 * | 7/2008 | Hamiti et al. | 370/389 |
| 7,546,376 B2 * | 6/2009 | Widegren et al. | 709/232 |
| 2001/0027490 A1 * | 10/2001 | Fodor et al. | 709/238 |
| 2002/0119821 A1 * | 8/2002 | Sen et al. | 463/42 |
| 2002/0120760 A1 * | 8/2002 | Kimchi et al. | 709/230 |
| 2003/0198184 A1 * | 10/2003 | Huang et al. | 370/231 |
| 2003/0236905 A1 * | 12/2003 | Choi et al. | 709/231 |
| 2006/0168303 A1 * | 7/2006 | Oyama et al. | 709/231 |

FOREIGN PATENT DOCUMENTS

| | | |
|---|---|---|
| EP | 1 241 911 | 9/2002 |
| JP | 2002-511672 | 4/2002 |
| WO | WO/98/23080 | 5/1998 |

(Continued)

OTHER PUBLICATIONS

Standards Track, RFC 1889, 6.2 RTCP Transmission Interval, Schulzrinne et al., Jan. 1996, pp. 19-22.

(Continued)

*Primary Examiner* — Douglas Blair
(74) *Attorney, Agent, or Firm* — Ware, Fressola, Van Der Sluys & Adolphson LLP

(57) ABSTRACT

The present invention relates to a method and a communication system for transmission of multimedia streams. Multimedia streams are transmitted in the communication system from a sending communication device to a receiving communication device at least partly via a wireless communication network. Information about the multimedia stream is transmitted to the receiving communication device comprising at least one parameter of the transmission of the multimedia stream for reservation of network resources. The parameter is the maximum bit rate which is needed for the transmission or the maximum service data unit size to be used in the transmission. It is also possible that both the mentioned parameters will be transmitted as attributes of the session description protocol. In an advantageous embodiment the receiving communication device informs the sending communication device about the QoS profile parameters which the wireless communication network granted for the transmission.

33 Claims, 3 Drawing Sheets

FOREIGN PATENT DOCUMENTS

| WO | WO 01/65779 | 9/2001 |
|---|---|---|
| WO | WO 02/25983 | 3/2002 |
| WO | WO 02/32165 | 4/2002 |
| WO | WO 02/41592 | 5/2002 |
| WO | WO 02/073998 | 9/2002 |

OTHER PUBLICATIONS

Internet Engineering Task Force, Draft, SDP: Session Description Protocol, by Mark Handley, Van Jacobson and Colin Perkins, May 27, 2002, Expires Nov. 2002, 46 pages.

K. Imura, et al., "The streaming technology and the standardization activity on the $3^{rd}$ generation mobile communication network"; IEICE Technical Report, NS2001-77, vol. 101 No. 194, pp. 99-104; IEICE, Jul. 11, 2001.

S. Matsui, et al., "Web Architecture for Home Applications Integrated with Audio and Visual Stream;" Matsushila Technical Journal, Oct. 1998, vol. 44, No. 5, pp. 106-112, Matsushita Electric Col, Ltd., Oct. 18, 1998.

T. Yoshimura, et al., "A special number featuring on mobile multimedia signal processing technique—multimedia delivering technique-"; NTT DoCoMo Technical Journal, vol. 8, No. 4, pp. 43-50, TTA, Jan. 1, 2001.

* cited by examiner

METHOD IN A COMMUNICATION SYSTEM, A COMMUNICATION SYSTEM AND A COMMUNICATION DEVICE

FIELD OF THE INVENTION

The present invention relates to a method in a communication system, in which multimedia streams are transmitted from a sending communication device to a receiving communication device at least partly via a wireless communication network. The invention also relates to a communication system comprising a sending communication device, a receiving communication device, and a communication network to transmit multimedia streams from the sending communication device to the receiving communication device at least partly via a wireless communication network. The invention further relates to a sending communication device and a receiving communication device.

BACKGROUND OF THE INVENTION

In this description, the term sending communication device refers to a communication device including a transmitter being arranged to send multimedia streams to a communication network. The term receiving communication device refers to a communication device including a receiver for receiving multimedia streams from the communication network, respectively. It is obvious that the same communication device may include both the transmitter and the receiver whereby allowing one-way or two-way communication with the communication network. A wireless communication device includes a transmitter and/or a receiver implementing wireless communication in a wireless communication network. The term wireless communication system, such as a mobile communication system, generally refers to any communication system which makes a wireless data transmission connection possible between a wireless communication device and stationary parts of the system, the user of the wireless communication device moving within the operating range of the system. A typical wireless communication system is a public land mobile network PLMN.

A well-known example is the GSM system (Global System for Mobile Telecommunications). The invention preferably relates to the third generation of mobile communication systems. As an example, the Universal Mobile Telecommunications System UMTS is used as an example of such a third-generation communication system.

In third generation systems, the terms bearer service and service are used. A bearer service is a telecommunication service type which provides the facility to transmit signals between access points. In general, the bearer service corresponds to the older term of a traffic channel which defines, for example, the data transmission rate and the quality of service (QoS) to be used in the system when information is transmitted between a wireless communication device and another part of the system. The bearer service between the wireless communication device and the base station is, for example, a radio bearer service, and the bearer service between the radio network control unit and the core network is, for example, an Iu bearer service (Interface UMTS bearer). In the UMTS system, the interface between the radio network control unit and the core network is called Iu interface. In UMTS there is also the so called GERAN part, which uses, in addition to the Iu interface, also an interface called as Gb interface. In this connection, the service is provided by the mobile communication network for performing a task (tasks); for example, data services perform data transmission in the communication system, telephone services are related to telephone calls, multimedia, etc. Thus, the service requires data transmission, such as a telephone call or the transmission of multimedia streams, between the wireless communication device and the stationary parts of the system. One important task of the operation of a third-generation mobile communication system is to control (initialize, maintain and terminate, according to the need) bearer services in such a way that each requested service can be allocated to mobile stations without wasting the available bandwidth.

The quality of service determines, for example, how protocol data units (PDU) are processed in the mobile communication network during the transmission. For example, QoS levels defined for connection addresses are used for controlling the transmission order, buffering (packet strings) and rejecting packets in support nodes and gateway support nodes, particularly when two or more connections have packets to be transmitted simultaneously. The different QoS levels determine, for example, different delays for packet transmissions between the different ends of the connection, as well as different bit rates. Also, the number of rejected and/or lost packet data units may vary in connections with different QoS levels.

It is possible to request for a different QoS for each PDP context. For example, in e-mail connections, a relatively long delay can be allowed in the transmission of streams. However, real-time interactive applications, such as video conferencing, require packet transmission at a high rate. In some applications, such as file transfers, it is important that the packet switched transmission is faultless, wherein in error situations, the packet data units are retransmitted, if necessary.

For the packet switched communication service in the UMTS system, the defining of four different traffic classes has been proposed, and for the properties of these traffic classes, the aim has been to consider the different criteria for the different connection types. One criterion defined for the first and second classes is that the transmission takes place in real time, wherein the transmission must have no significant delays. However, in such classes, the accuracy of the data transfer is not such an important property. In a corresponding manner, non-real time data transmission is sufficient for the third and fourth traffic classes, but a relatively accurate data transmission is required of them. An example of real-time first-class communication is the transmission of speech signals in a situation in which two or more persons are discussing with each other by means of wireless communication devices. An example of a situation in which real-time second-class communication might be feasible, is the transmission of a video signal for immediate viewing. Third-class non-real time packet communication can be used, for example, for the use of database services, such as the browsing of Internet home pages, in which the relatively accurate data transmission at a reasonable rate is a more important factor than the real-time data transmission. In the system according to this example, for example the transfer of e-mail messages and files can be classified to the fourth category. Naturally, the number of traffic classes is not necessarily four as mentioned here, but the invention can be applied in packet switched communication systems comprising any number of traffic classes. The properties of the four presented traffic classes are briefly presented in Table 1.

TABLE 1

| Class | First class (conversational class): real-time, e.g. telephone conversation guaranteed capacity no acknowledgement | Second class (streaming class): real-time, e.g. video information guaranteed capacity acknowledgement possible buffering on application level | Third class (interactive class): interactive best effort method acknowledgement Internet browser, Telnet real-time control channel | Fourth class (background class): background transmission by the best effort method acknowledgement background loading of e-mail messages, calendar events, etc. |
|---|---|---|---|---|
| Maximum bit rate | <2048 | <2048 | <2048 – overhead | <2048 – overhead |
| Delivery order | Yes/No | Yes/No | Yes/No | Yes/No |
| Maximum packet size (SDU) | $\leq$1500 or 1502 | $\leq$1500 or 1502 | $\leq$1500 or 1502 | $\leq$1500 or 1502 |
| Transmission of incorrect packets (SDU) | Yes/No/– | Yes/No/– | Yes/No/– | Yes/No/– |
| Residual bit error ratio | $5*10^{-2}, 10^{-2}, 5*10^{-3}, 10^{-3}, 10^{-4}, 10^{-5}, 10^{-6}$ | $5*10^{-2}, 10^{-2}, 5*10^{-3}, 10^{-3}, 10^{-4}, 10^{-5}, 10^{-6}$ | $4*10^{-3}, 10^{-5}, 6*10^{-8}$ | $4*10^{-3}, 10^{-5}, 6*10^{-8}$ |
| Packet error ratio (SDU) | $10^{-2}, 7*10^{-3}, 10^{-3}, 10^{-4}, 10^{-5}$ | $10^{-1}, 10^{-2}, 7*10^{-3}, 10^{-3}, 10^{-4}, 10^{-5}$ | $10^{-3}, 10^{-4}, 10^{-6}$ | $10^{-3}, 10^{-4}, 10^{-6}$ |
| Transmission delay | 100 ms—maximum value | 250 ms—maximum value | | |
| Guaranteed bit rate | <2048 | <2048 | | |
| Traffic processing priority | | | 1, 2, 3 | |
| Allocation priority | 1, 2, 3 | 1, 2, 3 | 1, 2, 3 | 1, 2, 3 |

The guaranteed bit rate is used for admission control and resource reservation at the RAN and CN, the maximum bit rate is used for policing at the CN, i.e. no higher than the maximum bit rate is allowed to enter the CN at the GGSN, packets that exceed this bit rate will be dropped.

Modern second and third generation wireless communication devices have much better data processing properties than older wireless communication devices. For example, they already have the facility of connecting to the Internet and using a browsing application in the wireless communication device to retrieve information from the Internet, and in the future, it will be possible to set up multimedia calls, for example, for real-time video conferences and the like.

The requirements of different applications may be significantly different. Some applications require fast communication between the sender and the receiver. These applications include, for example, video and telephone applications. Some other applications may require as accurate data transmission as possible, but the bit rate of the data transmission connection is less important. These applications include, for example, e-mail and database applications. On the other hand, these applications can be used in several wireless communication devices with different properties.

The user of the wireless communication device may be willing to watch a multimedia presentation with the wireless communication device. The user finds the loading address of such a presentation and sends a request to send the presentation to the wireless communication device. The request is handled in the communication system. The loading address of the requested multimedia presentation may address to a server in a communication network, such as a server of the Internet. The server which delivers the multimedia presentation to the receiving wireless communication device is called as a streaming server in this description.

The communication system should reserve enough resources for the communication between the streaming server and the wireless communication device to be able to deliver the requested multimedia presentation. Otherwise the presentation may not be presented with the same accuracy and error free in the receiving wireless communication device. In the UMTS communication system the wireless communication device requests a PDP context with certain QoS parameters first. Then, the network selects a bearer service for the connection by using some selection bases, for example, the parameters the wireless communication device has possible used in the request. Such selection bases may not be appropriate or accurate enough wherein situations may occur in which the bearer service can not provide enough transmission capacity for the connection, or it provides more capacity than is needed, wherein the usage of the network resources is not efficient.

Another situation in which a delivery of multimedia information may be needed is two wireless communication devices communicating with each other to exchange multimedia information such as video or still images. Also in this kind of situation enough resources should be reserved by the network for the communication. However, when using prior art methods it is not always possible to inform both ends of the connection about the demands for the connection.

Currently there is no way to signal end-to-end what is the maximum bit rate used by an application, for example, a video application. A streaming server is not able to signal the maximum bit rate of the encoded multimedia stream to the streaming client (the receiving wireless communication device). The latter has only information about the guaranteed bit rate, but not about the maximum bit rate. The client can then make three kinds of decisions. First, the client may choose a maximum bit rate (MBR) value that is equal to the guaranteed bit rate (GBR). This could cause packet losses and bad received quality whenever the bit rate exceeds the guaranteed bit rate (=maximum bit rate). For example, if the GBR=MBR=60 kbps and a compressed video source bit rate is encoded at 60 kbps on average, but some sporadic high bit rate peaks at 64 kbps are occurring, then the effect would be a certain period of packet losses at the receiving end (the period is equal to the time the bit rate exceeds 60 kbps). To avoid this situation, the MBR and GBR could be set in a way such that GBR=MBR=64 kbps. This would avoid packet losses, but it translates into an inefficient way of handling network resources through over-engineering, because the bandwidth between 60 and 64 kbps would not be used all the time, producing a waste of 4 kbps on average.

Second, the client may choose a maximum bit rate higher than the guaranteed bit rate by making some estimations. These estimations can be inaccurate, because even if the client uses past history information about the bit rate, the maximum bit rate used by a generic server cannot be easily predicted. Also in this case packet losses can occur.

Third, the client may choose a very high maximum bit rate value, in order to get a downgrading from the network to the maximum subscribed bit rate.

The second and third solutions would yield some inefficiencies because the streaming server would not be informed about the maximum bit rate of the UMTS bearer, making possibly wrong assumptions about transmission bit rate and bandwidth adaptation algorithms.

A conversational multimedia application in a mobile communication device is not able to signal the maximum bit rate of the session to the other mobile communication device. This means that each communication device (symmetrically) is able to know at what guaranteed bit rate the other communication device will encode the multimedia streams. However, each communication device (symmetrically) will not be able to know what is the downlink maximum bit rate. In other words, each communication device will not be able to know at what maximum bit rate the other communication device will encode the multimedia streams.

Also in this case the mobile communication device can decide to choose one of the three alternatives mentioned above. Also in this situation the choice of any of the mentioned alternatives would cause similar problems as described above for streaming, since each communication device would not know at what maximum bit rate the respective encoders will encode the media flows.

In present systems, the wireless communication device and the mobile communication network negotiate to select such a bearer service with which the QoS requirements can be fulfilled. For example, in the system according to the UMTS standard, the wireless communication device may freely request for a desired quality of service, wherein the UMTS mobile communication network examines if it can provide the quality of service requested by the wireless communication device. If the application to be executed in the wireless communication device contains QoS requirements, the wireless communication device transmits these QoS requirements as such to the mobile communication network, for the selection of the bearer service. However, if the application does not transmit QoS requirements to the wireless communication device, a default QoS profile stored in the network is normally used (typically in the Home Location Register, HLR), in which certain properties have been predetermined for the connection. If the properties of the wireless communication device do not, in all respects, meet the quality of service requested for the application, the performance of the application is probably not appropriate.

In addition to the maximum bit rate there is another parameter, the maximum service data unit (SDU) size parameter, which is not known by the other party of the connection, i.e. the streaming server and/or the sending communication device. The SDU size parameter describes the size of the packets of the multimedia stream transmitted by the streaming server. Therefore, the streaming client has to select for the maximum SDU size such a value which is big enough for the streaming client to be able receive all the packets. The streaming client may try an arbitrary value or it may select the maximum allowable value for the SDU size. This kind of selection may cause that unnecessary resources will be reserved for the multimedia streaming session.

It may also happen that when the streaming client sends a resource allocation request to the network (indicating, for example, maximum bit rate and maximum SDU size parameters in the request), the network may not (or cannot) reserve the requested resources. In prior art systems the streaming client can not inform the streaming server about the allocated resources. It may then happen that the streaming server sends the multimedia stream in larger data units than is appropriate for the connection between the wireless communication network and the wireless communication device.

If a certain fixed number of bytes (e.g. 1500 bytes) would be used all the time in the QoS profile, this would cause inefficiencies in the network and it could yield lower media quality to the packet switched streaming client. In fact, the network assuming all the packets of fixed size, would have more difficulties in maintaining the target SDU error ratio with the given delay in the QoS profile, because the larger the packets the more difficult it is to keep the target SDU error rate below a predetermined value.

SUMMARY OF THE INVENTION

It is thus an aim of the present invention to present a method and a system for informing the properties of the requested multimedia presentation for proper selection of network resources to transmit the multimedia presentation from the sending communication device to the receiving communication device.

The aims of the invention are achieved by using an attribute field of the session description protocol to inform the receiving party about the resources needed for the communication. The receiving party can then ask the wireless network to select a proper bearer service for the connection. The method according to the present invention is characterized in that the receiving communication device is informed of at least one of the following parameters of the transmission of the multimedia stream for reservation of network resources:
  the maximum bit rate
  the maximum service data unit size.

The communication system according to the present invention is characterized in that the communication system comprises:
  a detector to define at least one of the following parameters of the transmission of the multimedia stream:
    the maximum bit rate required by the transmission of the multimedia stream,
    the maximum service data unit size, and
  a transmitter to send at least said parameter to the receiving communication device for reservation of network resources.

The sending communication device according to the present invention is characterized in that the sending communication device comprises:
- a detector to define at least one of the following parameters of the transmission of the multimedia stream:
  - the maximum bit rate required by the transmission of the multimedia stream,
  - the maximum service data unit size,
- a message composer to set an attribute field of the session description protocol to the value of the defined parameter, and
- a transmitter to send at least said attribute field to the receiving communication device for reservation of network resources.

The receiving communication device according to the present invention is characterized in that the receiving communication device comprises:
- a selector to select a multimedia stream to be transmitted from the sending communication device to the receiving communication device.
- a transmitter to send information on the selection to the sending communication device and to request information on at least one of the following parameters of the transmission of the multimedia stream:
  - the maximum bit rate required by the transmission of the multimedia stream,
  - the maximum service data unit size, and
- a transmitter to send a request for reservation of network resources for receiving the selected multimedia stream.
- may also comprise a transmitter to send information on the granted network resources to the sending communication device including at least one of the following parameters:
  - the granted maximum bit rate,
  - the granted maximum service data unit size,
  - the granted transfer delay.

The present invention has considerable advantages when compared to systems and methods of prior art. The invention allows to make a streaming client aware of the maximum bit rate of pre-encoded multimedia streams transmitted by the streaming server. This allows a better bearer allocation by specifying a more precise QoS profile parameters.

The advantages for a conversational multimedia application is also the fact that the mobile communication device is aware of the maximum bit rate used from the other party when encoding multimedia streams. This also allows a better allocation of bearers by specifying more precise QoS profile parameters.

Another important advantage is given by the possibility to efficiently use the delta bandwidth computed as maximum bit rate–guaranteed bit rate. This bandwidth can be used for bandwidth adaptation or for handling peaks of video bit rate. Finally, this delta bandwidth can be used for delivering the best media quality when encoding multimedia streams in real-time, for example, by changing encoding parameters on the fly that have impact on the bit rate.

Yet another advantage of the maximum bit rate parameter in the SDP, is to enable the packet switched streaming client to choose among different alternatives according to the granted QoS profile parameters if the content is offered at different bit rates by the packet switched streaming server.

By the method of the invention, it is possible to select a bearer service which is optimal for the connection and which does not cause significant data losses during transmission. Also, by using the method of the present invention the network loading can be optimised because too much resources are not reserved for the connections The advantage of signalling the maximum SDU size from the packet switched streaming server to the packet switched streaming client relies in the fact that the PDP context can be activated in the wireless communication device with the right value of the parameter. Hence, a better media quality can be achieved when delivering multimedia presentations to the client. Also, the network can better maintain the target SDU error ratio with the given delay in the QoS profile than with prior art systems.

The advantage of communicating the granted QoS profile parameters from the packet switched streaming client to the packet switched streaming server gives a great advantage to the packet switched streaming server, that becomes aware of the actual values. In this way, the server can decide to change packetization strategy (to handle the new maximum SDU size value) and apply some transmission rate control technique to handle the new maximum bit rate value. In general, the server is enabled to deploy a better media quality to the packet switched streaming client.

DESCRIPTION OF THE DRAWINGS

In the following, the invention will be described in more detail with reference to the appended drawings, in which.

DETAILED DESCRIPTION OF THE INVENTION

Figure 1:
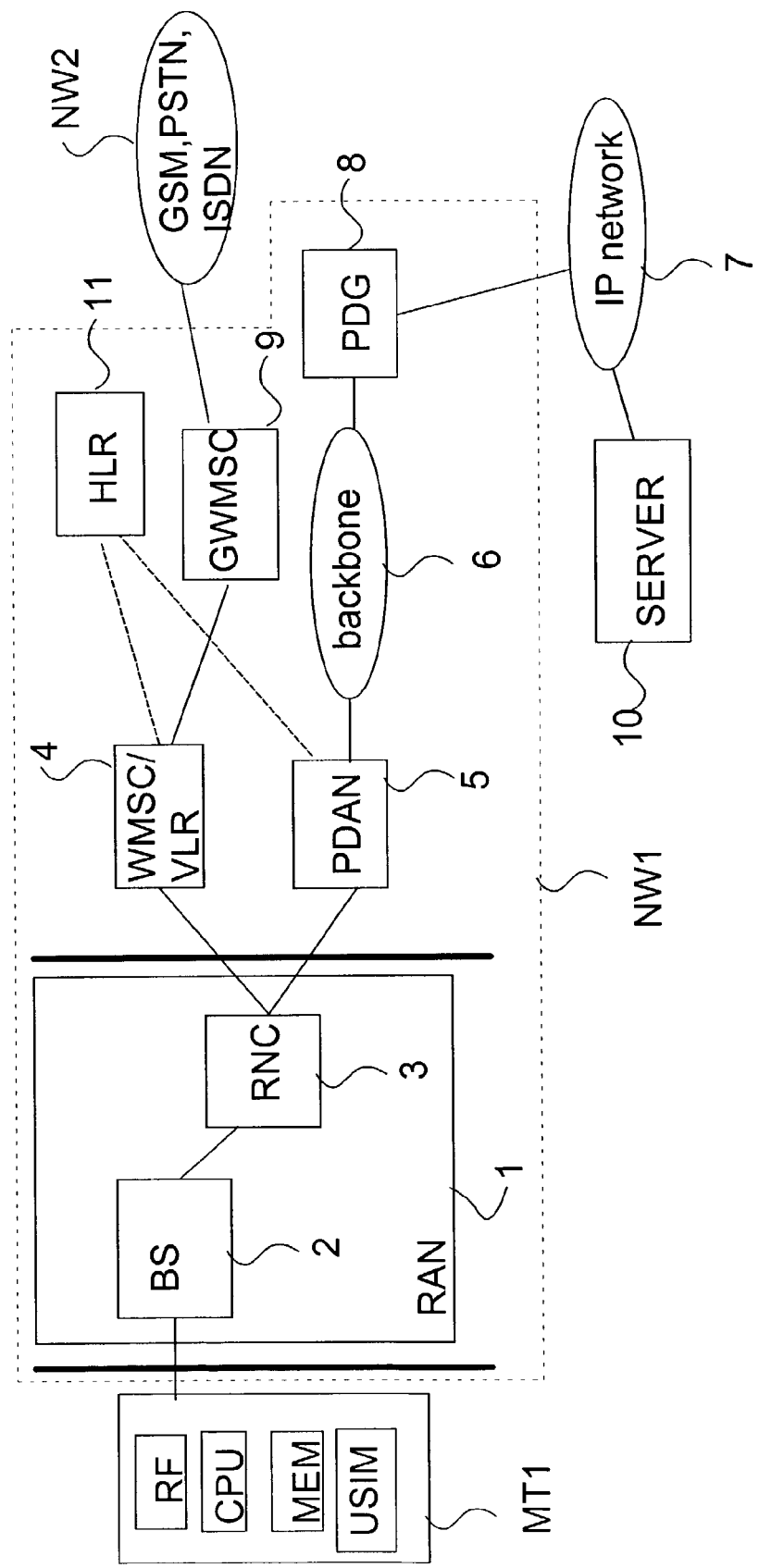
FIG. 1 shows a system in which the method according to a preferred embodiment of the invention can be applied.

In the following description of a preferred embodiment of the invention, a UMTS type mobile communication system will be used as an example; however, it will be obvious for anyone skilled in the art that the invention is not limited solely to this system but it can also be applied in other communication systems in which it is possible to determine various QoS levels for communication.

In the following the session description protocol (SDP) will be described in more detail.

On the Internet multicast backbone (Mbone), a session directory tool is used to advertise multimedia conferences and communicate the conference addresses and media-specific information necessary for participation. The multicast backbone is the part of the Internet that supports IP (Internet Protocol) multicast, and thus permits efficient many-to-many communication. It is used extensively for multimedia conferencing. Such conferences usually have the property that tight coordination of conference membership is not necessary; to receive a conference, a user at an multicast backbone site only has to know the conference's multicast group address and the UDP ports for the conference data streams.

Session directories assist the advertisement of conference sessions and communicate the relevant conference setup information to prospective participants. SDP is designed to convey such information to recipients. SDP is purely a format for session description—it does not incorporate a transport protocol, and can be conveyed with different protocols, including the Session Announcement Protocol, Session Initiation Protocol, Real-Time Streaming Protocol (RTSP), electronic mail using the MIME extensions, and the Hypertext Transport Protocol.

SDP is intended to be general purpose so that it can be used for a wider range of network environments and applications than just multicast session directories.

A multimedia conference is a set of two or more communicating communication devices along with the software they are using to communicate.

A multimedia session is a set of multimedia senders and receivers and the data streams flowing from senders to receivers. A multimedia conference is an example of a multimedia session.

In the following some details of the present definitions of session description protocol will be described with reference to page 8 of the document "Internet Engineering Task Force: draft-ieff-mmusic-sdp-new-10.txt" of May 27, 2002. Some descriptions of the protocol are required and some are optional. Optional items are marked with a '*'.

Session Description
v=(protocol version)
o=(owner/creator and session identifier).
s=(session name)
i=*(session information)
u=*(URI of description)
e=*(email address)
p=*(phone number)
c=*(connection information—not required if included in all media)
b=*(bandwidth information)
One or more time descriptions (see below)
z=*(time zone adjustments)
k=*(encryption key)
a=*(zero or more session attribute lines)
Zero or more media descriptions (see below)
Time Description
t=(time the session is active)
r=*(zero or more repeat times)
Media Description
m=(media name and transport address)
i=*(media title)
c=*(connection information—optional if included at session-level)
b=*(bandwidth information)
k=*(encryption key)
a=*(zero or more media attribute lines)

In this advantageous embodiment of the present invention the attribute informing the maximum bit rate in the SDP is made by the following means:

a=3gpp-maxbitrate:<value> where <value> is expressed with the same syntax as <bandwidth-value> in the b=AS SDP parameter. This is a user-defined attribute.

An alternative way to define this parameter is to use a new bandwidth descriptor b=X-3gpp-maxbitrate:<bandwidth-value>

The X-descriptors indicate experimental descriptors for SDP.

According to the above mentioned document the bandwidth description is defined as follows:

b=<modifier>:<bandwidth-value>

This specifies the proposed bandwidth to be used by the session or media, and is optional.

<bandwidth-value> is in kilobits per second by default. Modifiers may specify that alternative units are to be used.
<modifier> is a single alphanumeric word giving the meaning of the bandwidth figure. Two modifiers are initially defined:

CT (Conference Total): If the bandwidth of a session or media in a session is different from the bandwidth implicit from the scope, a 'b=CT: . . . ' line should be supplied for the session giving the proposed upper limit to the bandwidth used. The primary purpose of this is to give an approximate idea as to whether two or more sessions can co-exist simultaneously.

AS (Application-Specific Maximum): The bandwidth is interpreted to be application-specific, i.e., will be the application's concept of maximum bandwidth. Normally this will coincide with what is set on the application's 'maximum bandwidth' control if applicable. For RTP based applications, AS gives the RTP "session bandwidth" as defined in section 6.2 of RFC 1889 (RTP) (including media bit rate and UDP/IP headers overhead).

The Real Time Streaming Protocol is a client-server protocol for controlling the delivery of data with real-time properties. It is used to establish and control either a single or several time-synchronized streams of continuous media, such as audio and video. RTSP is conveyed with transport protocols such as UDP and TCP. In other words, RTSP acts as a network remote control for multimedia servers. Sources of data can include both live data feeds (e.g. real-time video and/or audio) and stored clips (e.g. still images). An RTSP client and server negotiate an appropriate set of parameters for media delivery, partially using e.g. SDP syntax to describe those parameters.

In this advantageous embodiment of the present invention the attribute informing the session maximum data unit size in the SDP is made by the following means:

a=3gpp-maxSDUsize:<value> where <value> is expressed as integer (number of bytes). This is also a user-defined attribute.

FIG. 1 shows a part of the UMTS system, comprising a wireless communication device MT1, a radio access node 1 (RAN) which comprises a base station 2 (BS), and a radio network controller 3 (RNC) which controls the base station 2 and routes the connections between the base station 2 and the rest of the system, a wireless mobile switching centre 4 (WMSC) and a packet data access node 5 (PDAN) as routing possibilities in addition to the radio network controller 3. The UMTS system according to FIG. 1 also comprises e.g. a backbone network 6 and a packet data gateway 8 (PDG) to other packet networks, such as the Internet Protocol (IP) network 7, wherein the wireless communication device can communicate with e.g. a server 10 coupled to the IP network. Furthermore, FIG. 1 shows a circuit switched gateway 9 (Gateway to Mobile services Switching Centre, GWMSC) to couple to e.g. to a second mobile communication network NW2, and a home location register 11 (HLR) e.g. to store the subscriber's access contract data.

Figure 3:
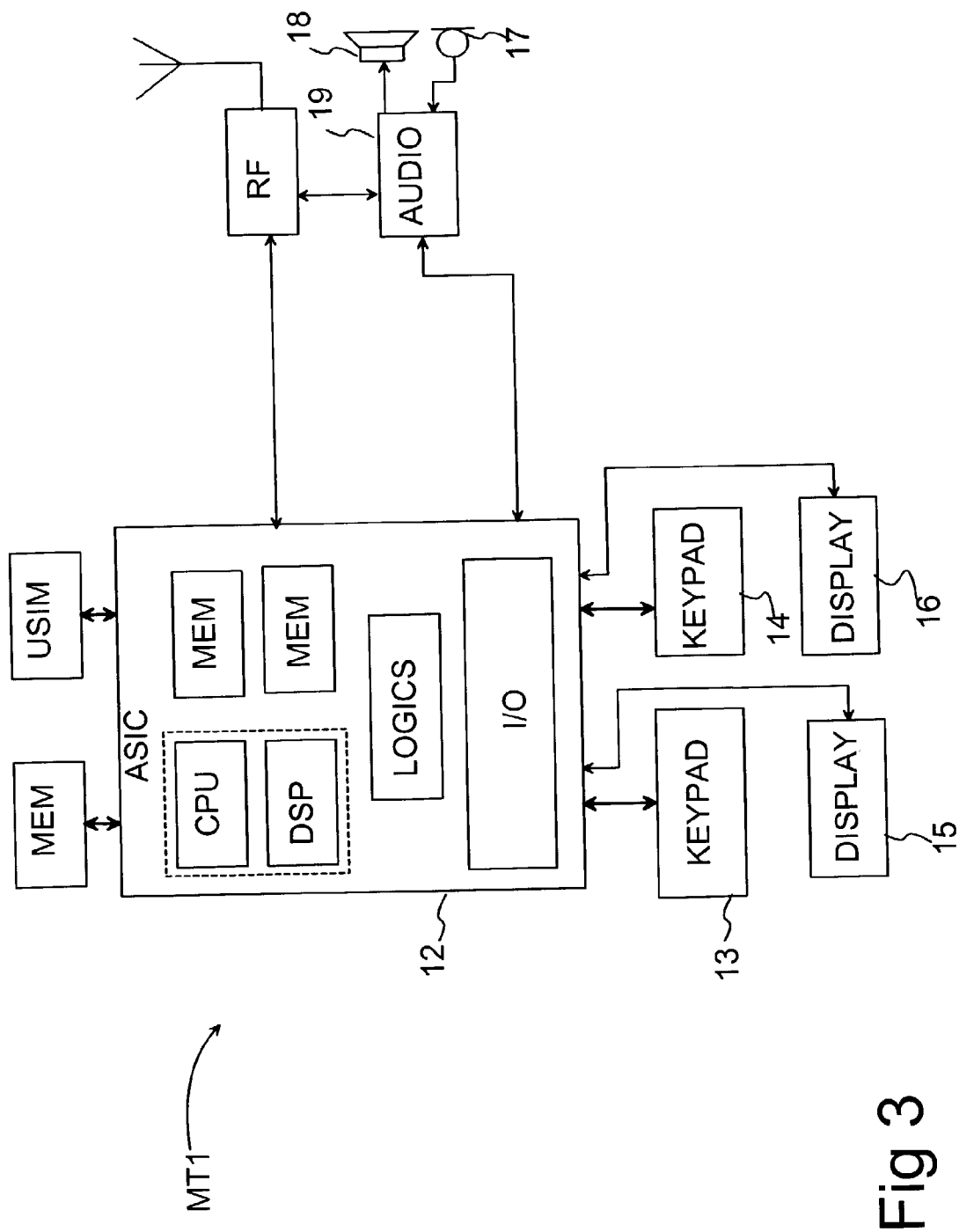
FIG. 3 shows a wireless communication device according to a preferred embodiment of the invention in a reduced block chart.

Further, FIG. 3 shows, in a reduced block chart, a wireless communication device MT1 complying with a preferred embodiment of the invention, which in this example is a communication device comprising data processing functions and mobile station functions, such as Nokia 9210i Communicator. The wireless communication device MT1 comprises e.g. one or more processors CPU, DSP, memory means MEM, the UMTS subscriber identity module (USIM) or corresponding means for identifying the subscriber, and a radio part RF for communication with the base station 2. The processor CPU can be integrated e.g. in an application specific integrated circuit 12 (ASIC), with which it is possible to perform a large number of the logical functions of the wireless communication device MT1. The memory means preferably comprise a random access memory (RAM), a read only memory (ROM), and at least part of the memory of the subscriber identity module USIM. The wireless communication device MT1 also comprises one or more user interfaces, preferably comprising a keypad 13, 14, a display device 15, 16, and audio means, e.g. a microphone 17, a speaker 18 and a codec 19.

In FIG. 1, it is assumed that the functions related to call management (CM) are implemented in the wireless communication device MT1 and in both the wireless mobile switching centre 4 and the packet data access node 5. These call management functions constitute the means for initializing, maintaining and terminating a call. Consequently, the wireless communication device MT1 and the wireless mobile switching centre 4 or the packet data access node 5 exchange call signalling messages to initialize, maintain and terminate a call. The functions of bearer management (BM) and radio resource management (RM) are implemented in the wireless communication device MT1 and in the radio network controller 3. The bearer management functions are utilized to select, for example, one or several logical channels according to the properties of the bearer service selected for communication between the wireless communication device MT1 and the base station 2, to provide a quality of service complying with the bearer service. The radio resource management functions are used, for example, to select the radio channel for the radio communication between the wireless communication device MT1 and the base station 2.

The packet data transmission connection between the wireless communication device MT1 and the IP network 7 can be set up from the packet data access node 5 (PDAN) via the packet data backbone 6 and the packet data gateway 8 (PDG). It is possible to set up a circuit switched data transmission connection between the wireless communication device MT1 and the mobile communication network via the radio access node 1, the wireless mobile switching centre 4 and the gateway to mobile services switching centre 9 (GWMSC). This gateway to mobile services switching centre 9 comprises means for setting up a connection between the mobile communication network and the second network NW2, such as GSM, PSTN or ISDN.

Basically, the present invention can be applied with two different kind of situations: streaming multimedia applications and conversational multimedia applications.

In the following, the method according to the a preferred embodiment of the present invention for streaming multimedia applications will be described with reference to the system of FIG. 1.

The user of the wireless communication device MT1 starts an application in the wireless communication device MT1, for example by means of the user interface of the wireless communication device MT1. The application is, for example, a game, a multimedia application, a radio channel listening application, a document viewing application, or a browser application, such as a WWW browser, in the network. The program code of this application can be preloaded e.g. from a server 10 coupled to the IP network and stored in the memory means MEM of the wireless communication device. The wireless communication device MT1 has an execution environment for executing such applications. It is activated by a service request transmitted by the application. The function of the execution environment in the wireless communication device is, for example, to determine the requirements related to the quality of service of the application.

The implementation of the execution environment and the requested application is controlled by the processor CPU of the wireless communication device. It is also possible that the wireless communication device comprises more than one processor CPU, but in the following, it is assumed that there is only one processor CPU for executing the application.

When the user has selected a multimedia presentation for watching by the wireless communication device MT1, a request is sent to the wireless network NW1. The request is advantageously a Describe message according to the session description protocol. The wireless communication device MT1 can be regarded as the packet switched streaming client (PSS client). The request is further transmitted to the streaming server (packet switched streaming server, PSS server) in question, for example the server 10 of the IP-network 7. The server 10 examines the request and retrieves information of the requested presentation to find out some at least the maximum bit rate needed for encoding the selected presentation. The presentation may be stored in encoded form in the server 10 wherein the server already has information of the maximum bit rate. If, however, the presentation is not stored in encoded form, the server 10 evaluates the maximum bit rate by using some suitable method for that. When the server 10 has gathered information on the maximum bit rate, information about the maximum bit rate is inserted as an attribute field in the session description protocol definition. The session description protocol definition information is transmitted from the server 10 to the wireless communication device MT1 via the IP-network 7 and the wireless network MT1. In the wireless communication device MT1 SDP information is examined and request for a PDP context (or a bearer service) using those parameters suggested by the server is formed and transmitted to the wireless communication network NW1. In the request the wireless communication device MT1 defines at least the maximum bit rate needed for the connection. Other parameters can be, for example, maximum SDU size, guaranteed bit rate, transfer delay, etc. as presented on Table 1. The request is examined in the wireless network NW1 and a selection is made for the bearer service. The wireless communication network NW1 tries to select such a bearer service for the connection which matches the requested QoS as best as possible and which does not reserve more network resources than necessary. Information about the selected bearer service is transmitted to the wireless communication device MT1. The parameters can correspond (be identical) to the parameters suggested by the server 10, or they may be downgraded by the wireless communication network NW1, for example, because of possible subscription limitations of the user.

In an advantageous embodiment of the present invention the wireless communication device MT1 sends a message to the server 10 to inform the QoS profile parameters granted by the wireless communication network NW1. The message is advantageously a RTSP-message and the parameters are informed as header fields of the message, such as 3gpp-GrantedMaxbitrate: <value>
    3gpp-GrantedMaxSDUsize:<value>
    3gpp-GrantedTransferDelay:<value>

The syntax of the first two is the same as the one defined for the corresponding SDP attributes. The syntax of the third attribute (granted transfer delay) is equal to the syntax of the second attribute and preferably it is expressed in milliseconds. The granted transfer delay indicates the delay within which the packets are transmitted from the streaming server to the streaming client.

The granted parameters can advantageously be transmitted by using RSTP messages e.g. as a SETUP message or a PLAY message after the PDP context has been activated in the wireless communication device MT1. The preferable solution is to embed the two headers in the first SETUP message sent by the wireless communication device MT1 to the server 10. After the message is received, the server 10 examines whether the granted QoS parameters correspond to the suggested parameters. If there are significant differences between the suggested and granted parameters, the server 10 can make a decision whether to change the transmission settings of the multimedia stream to be transmitted or not. The server can, for example, change the packetization method to such a method which is most appropriate for the granted QoS parameters. The server can also change the SDU size if necessary.

In the following there are depicted some non-restrictive examples of the messages according to an advantageous embodiment of the present invention:

SDP:
    a=3gpp-maxbitrate:70
    a=3gpp-maxSDUsize:1000

RTSP:
    C→S: SETUP rtsp://example.com/foo/bar/baz.rm RTSP/1.0 CSeq: 302
        Transport: RTP/AVP;unicast;client_port=4588-4589
        3gpp-GrantedMaxbitrate:64
        3gpp-GrantedMaxSDUsize:800
        3gpp-GrantedTransferDelay:2000

The transmission of the requested multimedia presentation from the server 10 can begin after the connection is established for the wireless communication device MT1. The transmission is advantageously performed in packet format wherein the multimedia presentation is encapsulated into packets of the protocol which is used in the IP-network 7. The packets are, for example, IP-packets. In the wireless network NW1 the IP-packets are delivered by protocols and means of the wireless network NW1.

The presentation may comprise such sections in which the bit rate exceeds the guaranteed bit rate of the session. However, it may not be sensible to reserve the resources according to the maximum bit rate but e.g. an average bit rate could be taken into account. In the method according to another advantageous embodiment of the present invention another parameter, a delta bandwidth known as such can be used in the above mentioned situations. This parameter expresses a difference between the maximum bit rate and the guaranteed bit rate and, hence, can be calculated by: maximum bit rate–guaranteed bit rate. This delta bandwidth can be used for bandwidth adaptation or for handling peaks of video bit rate. This delta bandwidth can also be used for delivering the best media quality when encoding multimedia streams in real-time, for example, by changing encoding parameters on the fly that have impact on the bit rate.

It is also possible that there are two or more alternatives to encode a multimedia stream. An example of this advantage follows: The PSS client issues a DESCRIBE RTSP message to the PSS server. The server responds with a SDP description (included in so called "200/OK" response message). The SDP description contains multiple alternatives of the same multimedia stream, each of which is targeted for different average and/or maximum bit rates (for example: choice1—GBR=64 kbps, MBR=64; choice2—GBR=64, MBR=128). A maximum bit rate higher than the average bit rate can be used to drop the duration of initial buffering, for example. The PSS client selects the preferred media stream according to end-user preferences and terminal capabilities and requests a PDP context with QoS profile parameters that match the average and maximum bit rate of the preferred stream. If the granted QoS profile parameters are lower than the requested ones, the PSS client has to select an alternative media stream whose bit rate parameters fit into the range of the granted QoS profile parameters. Finally, the PSS client issues a SETUP request to the PSS server indicating the chosen media stream.

Figure 2:
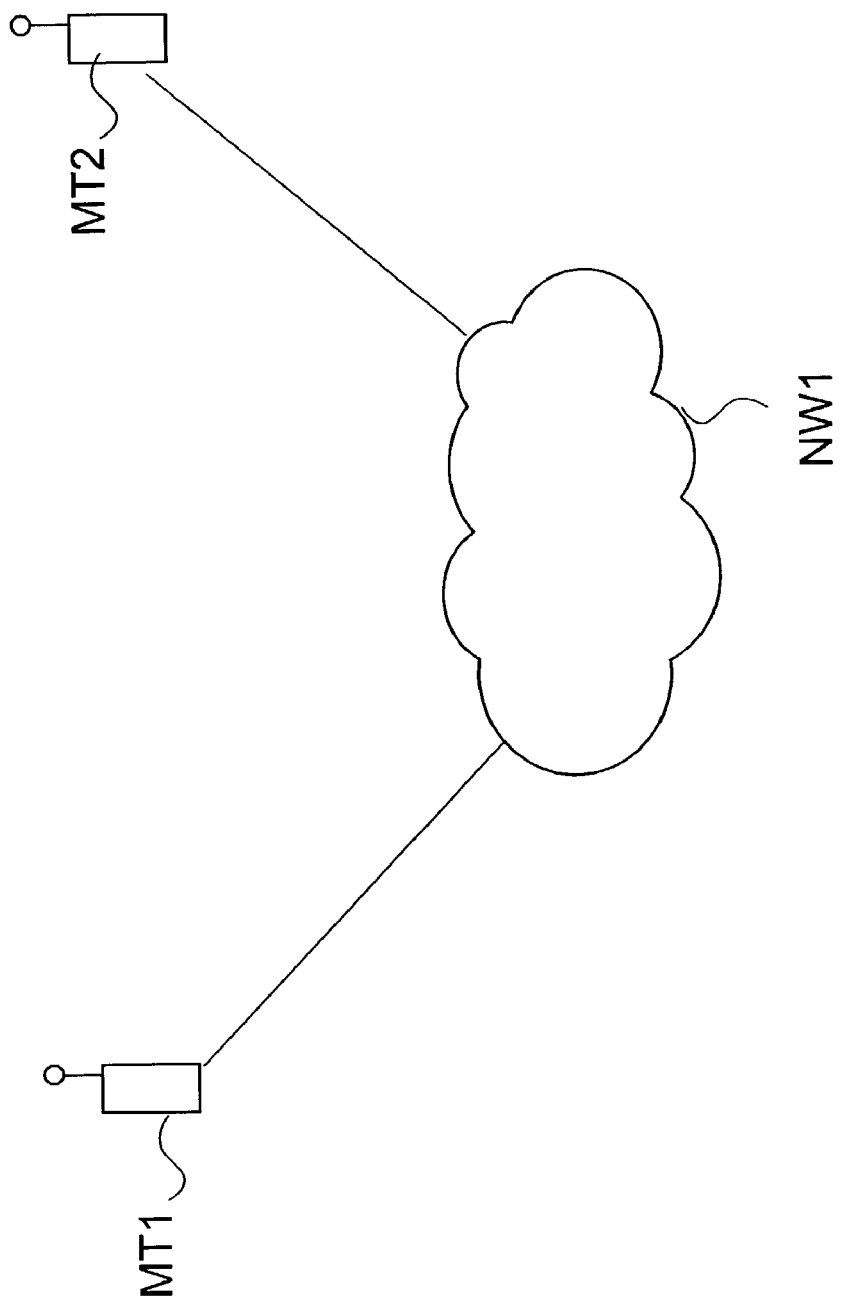
FIG. 2 shows another system in which the method according to a preferred embodiment of the invention can be applied.

FIG. 2 depicts another situation in which the present invention can be applied. It is related to conversational multimedia applications. There are two or more wireless communication devices communicating with each other via one or more communication networks NW1, for example, by using conversational multimedia applications. The first wireless communication device MT1 performs an attach to the wireless communication network NW1 and a PDP context activation to begin packet data communication with the network. Those procedures are known as such wherein it is not necessary to describe them in more detail here. Also the second wireless communication device MT2 performs similar tasks with the same wireless communication network NW1 or with another wireless communication network (not shown). The wireless communication network NW1 reserves certain resources for the wireless communication devices MT1, MT2 for the PDP context. The firs wireless communication device MT1 can inform the second wireless communication device MT2 about the maximum bit rate the first wireless communication device MT1 is allowed to use when it encodes the multimedia streams for transmission to the second wireless communication device MT2. The maximum bit rate information can be informed by using the above described attribute field of the session description protocol. Respectively, the second wireless communication device MT2 can inform the first wireless communication device MT1 about the maximum bit rate of the media information encoding process. However, the RTSP messages are not applicable with the conversational multimedia applications. When the necessary information is transmitted to the other party of the session, the communication can begin. Both the wireless communication devices MT1, MT2 are aware of the maximum bit rate and/or maximum SDU size, wherein the wireless communication devices MT1, MT2 can adapt the transmission according to the parameters.

It is obvious that the present invention is not limited solely to the above-presented embodiments but it can be modified within the scope of the appended claims.

The invention claimed is:

1. A method comprising:
at a receiving communication device, selecting a multimedia presentation to be transmitted from a sending communication device to the receiving communication device,
sending a request for the multimedia presentation from the receiving communication device to the sending communication device,
on the basis of the request for the selected multimedia presentation, determining at least one resource requirement regarding the transmission of the selected multimedia presentation,
transmitting, at least partly via a wireless communication network, to the receiving communication device, information on said at least one resource requirement for the selected multimedia presentation from the sending communication device,
sending a request from the receiving communication device to the wireless communication network, wherein the request includes the information on said at least one resource requirement,
receiving from the receiving communication device information regarding resources reserved for the receiving communication device, wherein said received information comprises at least one of the following:
a granted maximum bit rate,
a granted maximum service data unit size, and a granted transfer delay, and transmitting the information on said at least one reserved resource to the sending communication device.

2. A method according to claim 1, wherein information about the multimedia stream is transmitted by using a session description protocol, and an attribute field of the session description protocol is used to inform the receiving communication device of said at least one parameter.

3. A method according to claim 1 comprising:

selecting a multimedia stream for transmission to the receiving communication device, informing the sending communication device of the selection of the multimedia stream, examining the maximum bit rate of the selected multimedia stream, informing the maximum bit rate of the selected multimedia stream to the receiving communication device, and reserving communication resources for the receiving communication device for receiving the selected multimedia stream.

4. A method according to claim 3, wherein said reserving communication resources for the receiving communication device is performed by using said maximum bit rate.

5. A method according to claim 3 wherein the selected multimedia stream is a streaming multimedia application.

6. A method according to claim 5, wherein the sending communication device is a server being in a data transmission connection with Internet, the streaming multimedia application is stored on said server, wherein the streaming multimedia application is transmitted from the server to the Internet and further to the wireless communication network, from which the streaming multimedia application is transmitted to the receiving communication device by using the reserved resources.

7. A method according to claim 6 wherein the streaming multimedia application is transmitted from the server as serving data units having a defined maximum size, wherein the maximum size of the serving data unit is informed to the receiving communication device, wherein the receiving communication device reserves storage capacity for the serving data units according to the maximum serving data unit size.

8. A method according to claim 1, wherein the request for selection of the multimedia stream is informed from the receiving communication device by using a describe message of the session description protocol, the maximum bit rate of the selected multimedia stream is informed to the receiving communication device by using a response message of the session description protocol, information on reserved communication resources for the receiving communication device is transmitted to the sending communication device by using a SETUP message or a PLAY message of a real-time transmission protocol.

9. A method according to claim 1, wherein the maximum bit rate parameter contains a value in kbits for the maximum bit rate.

10. A method according to claim 1, wherein the maximum service data unit size parameter contains an integer value for the maximum service data unit size.

11. A method according to claim 1, wherein a suggested maximum transfer delay for any packet of the transmission is also informed.

12. A method according to claim 1, wherein the receiving communication device is informed of at least one of the following parameters of the transmission of the multimedia stream for reservation of network resources:

the maximum bit rate, the maximum service data unit size.

13. A communication system comprising:

a sending communication device, a receiving communication device, and a communication network to transmit multimedia streams from the sending communication device to the receiving communication device at least partly via a wireless communication network, wherein the receiving communication device comprises:

a receiver that receives information on at least one resource requirement determined on the basis of the multimedia streams for the transmission of a selected multimedia stream requested from the receiving communication device and receives information on at least one reserved resource from the wireless communication network in response to a request from the receiving communication device including the information on at least one resource requirement; and a transmitter for sending information on said at least one reserved resource to the sending communication device, said received information comprising at least one of the following:

a granted maximum bit rate, a granted maximum service data unit size, and a granted transfer delay.

14. A communication system according to claim 13, in which information on said at least one resource requirement is described with a session description protocol, wherein the communication system comprises a message composer to set an attribute field of the session description protocol to the value of said information on said at least one resource requirement.

15. A communication system according to claim 13, wherein the sending communication device is configured to transmit information about a maximum bit rate of the multimedia stream to the receiving communication device, and wherein the communication system further comprises a radio access node configured to reserve communication resources for the receiving communication device for receiving the multimedia stream, wherein the radio access node is arranged to use said maximum bit rate with the reservation of communication resources for the receiving communication device for receiving the multimedia stream.

16. A communication system according to claim 13, wherein the multimedia stream is used in a streaming multimedia application.

17. A communication system according to claim 16, wherein the sending communication device is a server being in a data transmission connection with Internet, the streaming multimedia application is stored on said server, wherein the multimedia streams of the streaming multimedia application is transmitted from the server to the Internet and further to the wireless communication network, from which the multimedia stream is transmitted to the receiving communication device by using the reserved resources.

18. A communication system according to claim 13, wherein a describe message of the session description protocol is arranged to be used to inform the selection of the multimedia stream, a response message of the session description protocol is arranged to be used to inform the maximum bit rate of the selected multimedia stream to the receiving communication device, information on reserved communication resources for the receiving communication device is transmitted to the sending communication device as a SETUP message or a PLAY message of a real-time transmission protocol.

19. A communication system according to claim 13, wherein the communication system comprises:
- a detector to define at least one of the following parameters of the transmission of the multimedia stream:
  - the maximum bit rate required by the transmission of the multimedia stream,
  - the maximum service data unit size, and
- a transmitter to send at least said parameter to the receiving communication device for reservation of network resources.

20. A sending communication device, comprising:
- a receiver configured to receive a request for a selected multimedia stream from a receiving communication device;
- a transmitter configured to transmit information on at least one resource requirement regarding the transmission of the selected multimedia stream determined on the basis of the multimedia stream; and
- said receiver further configured to receive information on at least one resource reserved for a receiving communication device and transmitted from the receiving communication device, the received information comprising at least one of the following:
  - a granted maximum bit rate,
  - a granted maximum service data unit size, and
  - a granted transfer delay.

21. A sending communication device according to claim 20, further comprising:
- a detector configured to define at least one of the following parameters of the transmission of the multimedia stream:
  - the maximum bit rate required by the transmission of the multimedia stream,
  - the maximum service data unit size, and
- a message composer configured to set an attribute field of a session description protocol to the value of the at least one defined parameter,
- wherein the transmitter is configured to send at least said attribute field to the receiving communication device for reservation of network resources.

22. A receiving communication device, comprising:
- a multimedia stream selector configured to select a multimedia stream for transmission from a sending communication device to the receiving communication device,
- a transmitter configured to send a request for the selected multimedia stream to the sending communication device;
- a receiver configured to receive information on at least one resource requirement determined on the basis of the selected multimedia stream for the transmission of the selected multimedia stream by the sending communication device in response to the request from the transmitter; and
- said transmitter further configured to send information on said at least one resource requirement to a communication network for reservation of resources for the transmission of the selected multimedia stream to the receiving communication device;
- said receiver further configured to receive information on at least one reserved resource from the communication network; and
- said transmitter further configured to transmit information on said at least one reserved resource to the sending communication device, the received information comprising at least one of the following:
  - a granted maximum bit rate,
  - a granted maximum service data unit size, and
  - a granted transfer delay.

23. A receiving communication device according to claim 22, wherein the transmitter is configured for:
- sending information on the selection to the sending communication device and
- requesting information on at least one of the following parameters of the transmission of the multimedia stream:
  - the maximum bit rate required by the transmission of the multimedia stream,
  - the maximum service data unit size.

24. The receiving communication device according to claim 23, further comprising a memory configured to reserve storage capacity for serving data units according to the maximum serving data unit size.

25. A method comprising:
- selecting a multimedia presentation to be transmitted from a sending communication device to a receiving communication device;
- sending a request for the multimedia presentation from the receiving communication device to the sending communication device;
- receiving information on at least one resource requirement regarding the transmission of the selected multimedia presentation, said at least one resource requirement having been determined on the basis of the selected multimedia presentation;
- transmitting information on said at least one resource requirement to a communication network for reservation of resources for the transmission of the selected multimedia stream to the receiving communication device;
- receiving from the communication network information regarding resources reserved for the receiving communication device; and
- transmitting information on said at least one reserved resource to the sending communication device, wherein said transmitted information comprises at least one of the following:
  - a granted maximum bit rate,
  - a granted maximum service data unit size, and
  - a granted transfer delay.

26. A method according to claim 25, wherein information about the selected multimedia stream is received by using a session description protocol, and an attribute field of the session description protocol is used to inform the receiving communication device of said at least one parameter.

27. A method according to claim 25 comprising:
- selecting a multimedia stream for transmission to the receiving communication device,
- informing the sending communication device of the selection of the multimedia stream,
- receiving information of a maximum bit rate of the selected multimedia stream from the sending communication device,
- reserving communication resources for the receiving communication device for receiving the selected multimedia stream.

28. A method according to claim 27, wherein said reserving communication resources for the receiving communication device is performed by using said maximum bit rate.

29. A method according to claim 27 wherein the selected multimedia stream is a streaming multimedia application.

30. A method according to claim 25, wherein the request for selection of the multimedia stream is informed from the receiving communication device by using a describe message of the session description protocol, the maximum bit rate of the selected multimedia stream is informed to the receiving communication device by using a response message of the session description protocol, information on reserved communication resources for the receiving communication device is transmitted to the sending communication device by using a SETUP message or a PLAY message of a real-time transmission protocol.

31. A method according to claim 25, wherein the maximum bit rate parameter contains a value in kbits for the maximum bit rate.

32. A method according to claim 25, wherein the maximum service data unit size parameter contains an integer value for the maximum service data unit size.

33. A method according to claim 25, wherein a suggested maximum transfer delay for any packet of the transmission is also informed.

\* \* \* \* \*